Patented Aug. 29, 1939

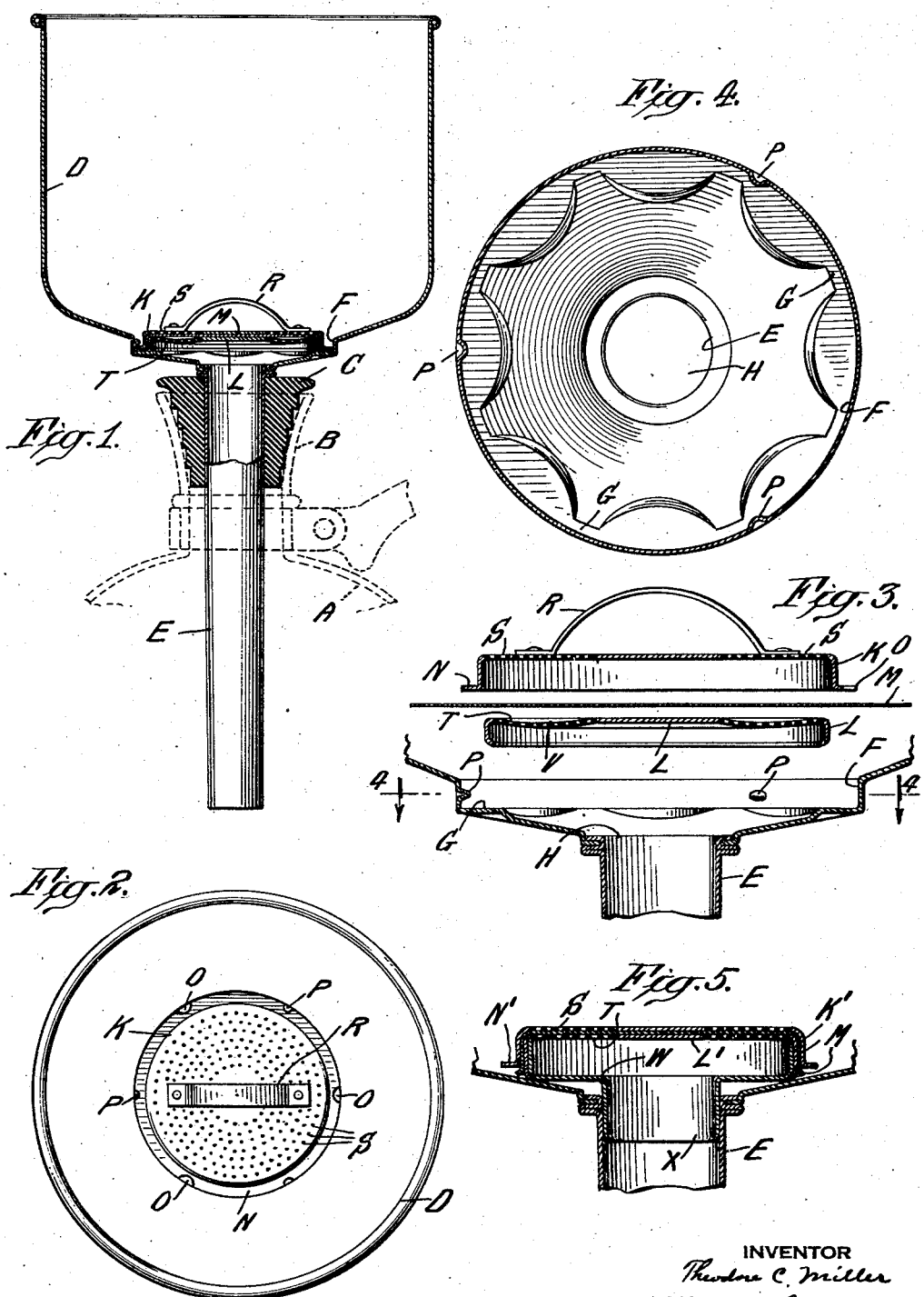

2,171,321

UNITED STATES PATENT OFFICE 2,171,321

COFFEE-MAKING APPARATUS

Theodore C. Miller, New York, N. Y.

Application June 17, 1937, Serial No. 148,642

2 Claims. (Cl. 53—3)

This improvement relates more particularly to a coffee maker of the vacuum type in which boiling water is forced by steam pressure from a pot up through a discharge tube and through a filtering unit into a bowl containing the ground coffee, from which it is drawn back into the pot by vacuum pressure, the liquid being filtered by the filtering unit, as it is drawn back into the pot through the ground coffee in the bowl.

For the best results in producing the coffee beverage by the vacuum method, a good filtering unit is an essential feature, and the present improvement provides a novel filtering device which preferably utilizes a thin filter paper which may be removed and thrown away after the making of each pot of coffee. In this way any stale coffee taste to succeeding pots of coffee is avoided, such as frequently occurs when cloth or other permanent filtering device or material is used.

The main object in the present improvement is to provide a filtering unit embodying a simple arrangement for inserting and removing a disc of filter paper or the like material, and at the same time provide a substantially tight joint between the filter and the discharge opening so that during the filtering process, none of the fine particles of ground coffee are passed through into the pot of beverage.

A further object is to provide a bowl with a recess in the bottom portion thereof in which the filtering unit is arranged to be removably mounted and held in place by inter-engaging parts operating somewhat like a bayonet connection so that the parts may be readily separated for thorough cleaning and for the removal and replacement of the filtering material.

The present improvement is more particularly shown in the accompanying drawing, in which Fig. 1 is a vertical section of the bowl and discharge tube, with the upper portion of the pot shown in dotted lines; Fig. 2 is a top plan view showing the filtering unit in position in the bottom of the bowl; Fig. 3 is an enlarged view of the parts in section, in vertical spaced relation, the upper part of the bowl and the lower part of the tube being broken away; Fig. 4 is a cross sectional top view of the recess for the filtering unit, the section being taken on the line 4—4 of Fig. 3 and Fig. 5 is a modification of the filtering unit with parts of the bowl broken away.

Referring to the drawing, it will be seen that the coffee maker comprises a pot A, preferably of glass, provided with a substantially conical mouth B, in which a rubber plug or stopper C (preferaly stepped as shown) is adapted to fit so that during the process of making the coffee, a substantial vacuum may be established in the pot.

The removable upper portion or bowl D of the coffee making apparatus, in the present instance, is preferably of metal and formed or spun into the shape substantially as shown in Fig. 1 and is provided with a depending centrally disposed discharge tube E which may be formed integral with the bowl or secured thereto in any preferred manner, as by spinning over the end of the tube as shown in the drawing. As will be seen in Fig. 1, the rubber plug or stopper C is perforated and fits tightly upon the discharge tube E and is located at a point just under the bowl D.

It will be seen that the bottom of the bowl D is provided with a recess F having substantially vertical walls and provided with a flat radially extending ledge G preferably scalloped as indicated in Fig. 4 to provide channels for discharge of the liquid coming through the filtering element. The bottom of the recess F beyond the radial ledge G is conically sloping toward the center as indicated in Fig. 3 to conduct the filtered liquid to the opening H in the upper end of the discharge tube E, the latter being preferably of uniform diameter, although this is not essential.

The filtering unit preferably comprises two nesting shallow cup-like members or elements K and L between which a disc of filter paper M or other suitable material is adapted to be clamped, the spacing between the nesting elements K and L, that is the relative diameters of the two, being sufficient to accommodate therebetween a thin filter paper. It will be understood, however, that provision may be made for using a disc of any usual or preferred type of filtering material.

In order to secure the filtering unit, comprising the parts K, L and M when united as indicated in Fig. 1 within the recess F in the bottom of the bowl, the upper cup-like filter element K is provided with an outwardly extending radial flange N which is provided with a plurality of notches O (Fig. 2) arranged to cooperate with lugs or projections P, extending radially inward from the wall of the recess F, substantially as shown in Figs. 2, 3 and 4. The notched flange N and the projections P are adapted to cooperate to form inter-engaging elements substantially like a bayonet joint for removably holding the filtering device in proper cooperative relation with the opening into the discharge tube, substantially as shown in Fig. 1.

As will be seen in the drawing, a substantially rigid handle or finger piece R is secured to the cup-like member K of the filtering device so that the flange N and the entire device may be rotated to lock it under the projections P as indicated in Fig. 2.

In order that the liquid may more readily pass through the filtering device and to properly protect the filter paper, screens or a plurality of perforations S are preferably provided in the closed end or bottom of the cup-like flanged member K and a screen or a similar series of perforations T are provided in the cooperating nesting member L of the filtering device. As an important feature when perforations are used, it will be seen that the perforations in the nesting cup-like member L are located in an annular curved depression V as more particularly seen in Figs. 1 and 3. This arrangement is found advantageous in allowing a certain amount of freedom of motion for the filter paper, so as to prevent blocking the discharge of liquid through the filter, which might occur if the perforations should happen to come too closely into register in mounting the nesting portion L in the outer flanged portion K.

In Fig. 5 there is shown a modification which has been satisfactory in practical use, but is not quite as compact as the form shown in the other drawings. In this modification, the inner cup-like nesting member L' has the edge of its open end rolled over a cup-like portion W of a small flat funnel-like element provided with a depending tubular portion X adapted to slide into and frictionally fit the upper end of the discharge tube E so that the filtered liquid is discharged directly thereinto.

In this form the upper member K' of the nesting cup members is formed substantially the same as the member K and between the two members, as will be seen in Fig. 5, there is mounted the filter paper M or other filter material, the thickness of the latter being such that the two perforated members are held in frictional engagement with the filter paper, but to change the filter paper the outer cup-like member K' may be removed by means of the flange N'.

In the operation of the preferred form of the device, it will be understood that the filtering unit is assembled by placing a disc of filter paper M over the lower perforated nesting element L in concentric relation thereto and forcing the upper perforated cup-like element K down over the filter paper so that the outer periphery of the latter will extend outward under the flange N. Thus when the assembled filtering unit is placed in the bowl recess F with the notches O in register with the inward projections P and the entire unit rotated by means of the handle R, the flange N becomes locked under the projections P in a form of bayonet connection and by means of the intervening filter paper, that is the portion extending outward under the flange N, there will be formed a tight joint over the opening H into the discharge tube E.

By reversing the rotation of the filtering element by means of the handle R, the entire element may be withdrawn after making the pot of coffee and a new disc of filter paper inserted in place of the used one, thereby providing a fresh filter for each pot of coffee.

While the preferred form of the device has been more particularly shown and described, it will be understood that various modifications and rearrangements thereof may be made without departing from the spirit and scope of the invention.

I claim:

1. In a coffee making apparatus, a bowl provided with a depressed portion in the bottom thereof having a central opening connected with a discharge tube, the walls of said depressed portion being substantially at right angles to an annular flat portion connected with channels sloping to said central opening, retaining lugs extending inward from and spaced circumferentially of said walls at a uniform distance above said annular flat portion and a filter unit comprising two perforated parts arranged to clamp and support a filter paper therebetween, said filter unit having a radial flange provided with notches circumferentially spaced for cooperation with said lugs, said notches and lugs being arranged so that the outer periphery of said flange may be brought into engagement with the under sides of said retaining lugs for securing the filter unit in said depressed portion, sufficient space being allowed under said lugs for the filter paper to extend between said radial flange and said annular flat portion so as to form therebetween a substantially water-tight joint when said filter unit flange is secured under said lugs.

2. The coffee making apparatus as in claim 1 wherein said filter unit comprises an inverted cup-like member having a perforated bottom portion and from the open end of which said radial flange extends and a similar inverted perforated bottom cup-shaped member nesting within said flanged member with sufficient space for clamping and supporting the filter paper therebetween.

THEODORE C. MILLER.